United States Patent
Borkenhagen (10) Patent No.: US 7,930,483 B2
(45) Date of Patent: Apr. 19, 2011

(54) ASSOCIATIVITY IMPLEMENTATION IN A SYSTEM WITH DIRECTLY ATTACHED PROCESSOR MEMORY

(75) Inventor: John M. Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/041,894

(22) Filed: Mar. 4, 2008

(65) Prior Publication Data
US 2009/0228656 A1 Sep. 10, 2009

(51) Int. Cl.
G06F 12/16 (2006.01)
(52) U.S. Cl. ......................................... 711/118
(58) Field of Classification Search ........... 711/118
See application file for complete search history.

(56) References Cited

U.S. PATENT DOCUMENTS

| | | | |
|---|---|---|---|
| 5,555,392 A * | 9/1996 | Chaput et al. ................. 711/118 |
| 5,812,817 A | 9/1998 | Hovis |
| 6,658,549 B2 | 12/2003 | Wilson |
| 6,681,305 B1 | 1/2004 | Franke et al. |
| 6,766,429 B1 | 7/2004 | Bland et al. |
| 6,775,751 B2 | 8/2004 | Tremaine |
| 6,944,740 B2 | 9/2005 | Abali et al. |
| 6,956,507 B2 | 10/2005 | Castelli et al. |
| 6,961,821 B2 | 11/2005 | Robinson |
| 6,968,424 B1 | 11/2005 | Danilak |
| 7,302,543 B2 | 11/2007 | Lekatsas et al. |
| 7,360,024 B2 * | 4/2008 | Hironaka et al. ............. 711/131 |
| 7,636,810 B2 | 12/2009 | Ramakrishnan |
| 2006/0069879 A1 * | 3/2006 | Inoue et al. ................... 711/147 |
| 2006/0101206 A1 * | 5/2006 | Wood et al. ................... 711/122 |

OTHER PUBLICATIONS

IBM Memory Expansion Technology (MXT) Datasheet [online]. International Business Machines Corporation, 2000 [retrieved on Feb. 13, 2008]. Retrieved from the Internet: <URL: http://www.research.ibm.com/journal/rd/452/tremaine.html>.

Tremaine et al., IBM Memory Expansion Technology (MXT), IBM Journal of Research and Development, vol. 45, No. 2, Mar. 2001, (pp. 271-285).

* cited by examiner

*Primary Examiner* — Duc T Doan
(74) *Attorney, Agent, or Firm* — Toler Law Group (57) ABSTRACT

A method, apparatus and program product enable associativity operations for system including a processor having directly attached memory. A memory expander microchip facilitates concurrent memory access while attached to a processor. Associativity may have particular application in the context of accessing a data cache, which may be present on the memory expander microchip or memory in communication with the microchip. The memory expander microchip and associated memory channels may provide additional bandwidth and memory capacity for the system to enable associativity in a manner that does not burden the attached processor or associated operating system. Bandwidth and memory may be dynamically allocated to optimize associativity and applicable operating ratios.

21 Claims, 3 Drawing Sheets

FIG. 4 and may additionally dynamically alter the amount of compressed data in the memory expansion logic.

ASSOCIATIVITY IMPLEMENTATION IN A SYSTEM WITH DIRECTLY ATTACHED PROCESSOR MEMORY

RELATED APPLICATIONS

The present application relates to co-pending U.S. patent applications, entitled "Memory Compression Implementation in a System with Directly Attached Processor Memory" Ser. No. 12/041,863 and "Memory Compression Implementation in a Multi-Node Server System with Directly Attached Processor Memory" Ser. No. 12/041,911, both by the same inventor, John M. Borkenhagen, both of which are filed concurrently herewith, and which are incorporated by reference in their entireties.

FIELD OF THE INVENTION

The present invention generally relates to computer memory architecture, and in particular, to an architecture for managing memory.

BACKGROUND OF THE INVENTION

Increased processor demands continue to drive advances in central processing units (CPUs), bandwidth and associated memory devices. A CPU typically includes a die, or microchips, which contain multiple processing units, communications hardware, and a local networking or communications bus. The core logic chipsets (cores) are the components that make up the processor die. The cores comprise the central processing logic of a computing system. A system's core logic typically includes a controller for handling memory functions, a cache for storing instructions, the logic for bus interfaces, and the functions of data paths. A single die can contain hundreds of processor cores. In increasing the number of cores, computer performance also increases, as does the need for more memory. For efficiency considerations, the memory-to-processor core ratio must stay relatively constant. That is, as more processors are added, memory must be proportionally added.

The need for higher memory to processor-core ratios is further driven by advances in virtualization. Virtualization makes it possible to run multiple operating systems and multiple applications on the same computer at the same time, increasing the utilization and flexibility of hardware. In one respect, virtualization allows the transformation of hardware into software, including the CPU, RAM, hard disk and network controller, to create a fully functional virtual machine that can run its own operating system and applications just like a physical computer. Virtualization is advantageous because it allows for server consolidation and increased processor accessibility. And thus, virtualization is driving the need for even higher memory to processor-core ratios, and higher memory capacity on servers.

The increased processing afforded by virtualization requires the addition of memory to maintain the required ratio. For speed considerations, the preferred way to add memory is to attach main memory directly to the CPU. Performance is increased with data being stored directly in main memory, as opposed to slower, remote memory, e.g., memory on a disk. However, attaching memory directly to the CPU typically imposes a limitation on the total amount of available memory. Attached memory may be inadequate for applications requiring larger memory capacities.

Caching is commonly used to speed memory processes. A cache memory is smaller, faster and typically more expensive than main memory. When a CPU requests data that resides in main memory, the processing system transmits the requested data to the processor and also may store the data in a cache memory. When the processor issues a subsequent request for the same data, the processing system first checks cache memory. If requested data resides in the cache, the system gets a cache "hit" and delivers the data to the processor from the cache. If the data is not resident in the cache, a cache "miss" occurs, and the system retrieves the data from main memory. Frequently utilized data thus is retrieved more rapidly than less frequently requested data, and overall data access latency, i.e. time between a request for data and delivery of the data, is reduced.

In associative mapping, instead of hard-allocating cache lines to particular memory locations, it is possible to design the cache so that any line can store the contents of any memory location. A cache line is the smallest unit of memory than can be transferred between the main memory and the cache. Associativity improves performance by, in part, enabling multiple concurrent accesses to portions of memory.

Relatively large amounts of bandwidth are needed to support associativity, however. On some processor memory architectures, for instance, the x86, there is not enough memory bandwidth (the amount of data that can be carried from one point to another in a given time period) to support a cache with associativity. The inability to support cache access with associativity relegates manufacturers to using other, less efficient forms of memory access and lower performance.

Consequently, what is needed is an improved manner of managing memory in a system comprising a processor with directly attached memory.

SUMMARY OF THE INVENTION

The present invention includes an improved apparatus, program product and associated methods of managing memory comprising attaching a memory directly to a processor, and concurrently accessing portions of the memory attached to the processor and/or another memory using memory expander logic in communication with both the processor and the other memory. In one embodiment, a data cache may be concurrently accessed. The memory expander logic may reside on a microchip in communication with the processor.

In one aspect of the invention, data may be concurrently accessed using a plurality of memory channels in communication with the memory control logic. A subset of the plurality of memory channels may be designated for use in accessing the portions. Concurrent accesses may include read and write operations.

According to another aspect of the invention, uncompressed, frequently used data may be stored in the memory directly attached to the processor. Less frequently used data, including compressed data and/or uncompressed data may additionally be stored in the other memory. Where desired, the concurrent access implementation by the memory expander logic may be initiated by the processor.

Embodiments consistent with the invention may dynamically allocate a plurality of memory channels in communication with the memory control logic to a memory component based on a compression hit ratio. The memory component may include a cache or a memory storing compressed and/or uncompressed data. Where desired, embodiments may dynamically alter available uncompressed memory in parallel with a decrease in available compressed memory. Aspects may additionally and dynamically alter an amount of uncompressed data in the memory expansion logic. Embodiments may further dynamically alter an amount of uncompressed data in the memory expansion logic according to a compression ratio.

Another embodiment consistent with the invention includes a method of managing memory comprising attaching a memory directly to a processor, and accessing data in another memory using associativity implemented by memory expander logic in communication with the processor and the other memory.

Another aspect of the invention comprises an apparatus that includes a first memory, a second memory, a processor directly attached to the first memory, and memory expander logic in communication with both the processor and the second memory, the memory expander logic including a plurality of memory channels and being configured to concurrently access multiple portions of at least one of the first and second memories.

The memory expander logic may reside on a microchip in communication with the processor. The memory channel of the plurality of memory channels may comprise the second memory. The second memory may include a cache configured to be concurrently accessed. The memory expander logic may include a cache configured to be concurrently accessed.

According to another aspect of the invention, a subset of the plurality of memory channels may be designated to concurrently access the multiple portions. The memory expander logic may include a compression/decompression engine. The second memory may include compressed and/or uncompressed data.

An embodiment consistent with the invention may include a circuit in communication with both a memory and a processor having directly attached memory. The circuit may be configured to concurrently access data in at least one of the memory and the directly attached memory.

According to another aspect of the invention, a program product may comprise program code configured to implement operations to concurrently access memory in response to a command from a processor having directly attached main memory, and a computer readable medium bearing the program code.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the underlying principles of the present invention may enable associativity operations for a system including a processor having directly attached memory. A memory expander microchip facilitates concurrent memory access while attached to a processor. Associativity may have particular application in the context of accessing a data cache, which may be present on the memory expander microchip or memory in communication with the microchip. The memory expander microchip and associated memory channels may provide additional bandwidth and memory capacity for the system to enable associativity in a manner that does not burden the attached processor or associated operating system. Bandwidth may be dynamically allocated to optimize associativity.

The memory expander microchip may comprise memory control logic, typically on a silicon microchip, which implements concurrent memory read and write commands generated by and communicated from a processor. As such, the memory expander microchip may not execute program instructions like a CPU, but rather, facilitates memory read and write commands generated to enable increased capacity. The memory expander microchip may include its own memory control logic, and may be attached directly to dual inline memory modules (DIMMs). DIMMs are small circuit boards that hold memory chips. In some embodiments, the memory expander microchip may include I/O capability.

The memory expansion chip includes multiple memory channels to support, among other features, multi-way, concurrent memory access. The memory channels may provide more memory bandwidth than the CPU and I/O will generally consume. The additional memory bandwidth may be available to support multi-way associativity for a memory compression cache. This feature may result in improved performance for memory compression. The memory expansion chip technology and memory compression may be mutually beneficial. Namely, the memory expansion chip may provide the additional bandwidth required for memory compression and an associative compression cache, while memory compression may enhance the performance of large memory systems.

In a conventional processor system without a memory expander microchip, there is limited memory bandwidth to the memory directly attached to a processor. The limited bandwidth inhibits memory compression. Memory compression is sometimes used to optimize available memory. Using compression, data may be encoded (represented as symbols) to take up less space. Memory compression effectively expands memory capacity up to two or more times for some applications without increasing actual physical memory and associated expenses.

Memory compression is often measured in terms of its associated compression ratio. The compression ratio is the quotient of memory space required by uncompressed data relative to the smaller amount of memory space required by compressed data. As data changes in main memory, the compression ratio can also change. When the compression ratio decreases, more physical memory is required. As a result, some physical memory must be vacated to accommodate changing data having a small compression ratio Memory compression requires memory bandwidth for compression cache accesses, translation table/directory and compression cache lookups. In the event of a cache miss, bandwidth is required for uncompressed data accesses. This bandwidth requirement may be larger than what is required for a traditional, uncompressed access to the main store. A miss in the compression cache (caching data associated with compressed data) typically results in the accessed data being from an unintended address. If every memory access misses the compression cache, memory bandwidth requirements may triple compared to a system without memory compression. Such a scenario may result in three access operations: one access to the compression cache, one access to the compressed data directory (address translation table for compressed data held in the main store), and then a third access to the compressed data. The directory information for the compression cache may be held with the data in the main memory that holds the compression cache, in a directory contained in the memory controller chip, or in the compressed data directory. Directory information may reside in the main memory with the compressed data directory. Alternatively, the directory information may reside in the compression cache data to allow flexibility in compression cache size and to keep the memory controller chip area manageable.

When directory information is held in the main memory, a memory write may require a read of the directory information, followed by a write. The memory bandwidth limitations on a directly attached processor are limited to a degree that they inhibit the use of memory compression without the addition of a memory expander microchip. When the compressed data directory holds the compression directory information, it may be accessed in parallel with the compression cache. Even if the compressed data directory does not hold the compression directory information, the compressed data directory needs to be accessed to locate the desired compressed memory location.

The memory expander microchip provides additional system main memory. A memory expander microchip has multiple memory channels to support connection to multiple memory DIMMs for additional memory capacity. For example, a typical memory expander microchip may include eight memory channels. This inclusion effectively adds eight memory channels worth of bandwidth in addition to the standard bandwidth from the memory directly attached to the processor.

The eight memory channels provide more than enough bandwidth to support accesses to a compression cache, the compressed data directory (addresses to the compressed data), and sometimes compression directory information in instances when there are misses to the compression cache.

In this capacity, memory channels may function to deliver data from one point to another. The memory channel may comprise one or more of the following components: format conversion devices, encoders (compressors) and decoders (decompressors), buffers, stream segmentation and reassembly devices, multiplexors and demultiplexors, modulators and demodulators, transmission facilities, switches, multipoint conference units, and other components necessary to achieve the desired channel characteristics. A sequence of data bits submitted to the channel input results in a similar (not necessarily identical) sequence of bits at the channel output. For purposes of this specification, memory channels may include memory.

Some of the memory channels on the memory expansion chip may be allocated to compressed data and others may be allocated for the compression cache. Memory attached directly to the processor may be standard uncompressed data regions (neither compressed data nor a compression cache). Each memory channel dedicated to the compression cache may be a way, or class, for the associative compression cache.

All classes from the associative compression cache may be accessed in parallel. The logic on the memory expander microchip may determine if there is a hit to any of the classes. The hit information may come from the compression cache or the compressed data directory. If any of the compression cache classes has a hit, that data may be forwarded to the processor as with a conventional data store to main memory.

In the example of a memory expander having eight memory channels, four of the memory channels may be allocated to the compressed data and compressed data directory. The other four memory channels may be allocated to the compression cache. As such, the compression cache may include four-way associative processes by virtue of using the four memory channels allocated to the compression cache.

As will be apparent to one of skill in the art, the memory expander microchip may include fewer or more than eight memory channels. Moreover, there may be more than one memory expander microchip, and more or less memory channels could be allocated to the compression cache.

Where desired, the memory expansion chip compression control logic may dynamically allocate a different ratio of channels between compressed data and the compression cache based on the compression cache hit ratio. The compression cache associativity may be dynamically increased and decreased to determine the optimal associativity ratio to compressed data. As compressed data memory is reduced, the operating system or hypervisor may reduce the number of available memory pages in main store. As compressed data memory is increased, the operating system or hypervisor may increase the number of available memory pages in main store.

The memory expander microchip of another or the same embodiment may include some attached memory comprising standard, uncompressed memory data, e.g., not data cache or compressed data. In addition to static allocation, the hypervisor or operating system may monitor compression ratios and make more memory on a memory expansion microchip be standard memory. This may occur if the compression ratio is low. If the compression ratio is high, more memory on the memory expansion microchip may be compressed data.

Figure 1:
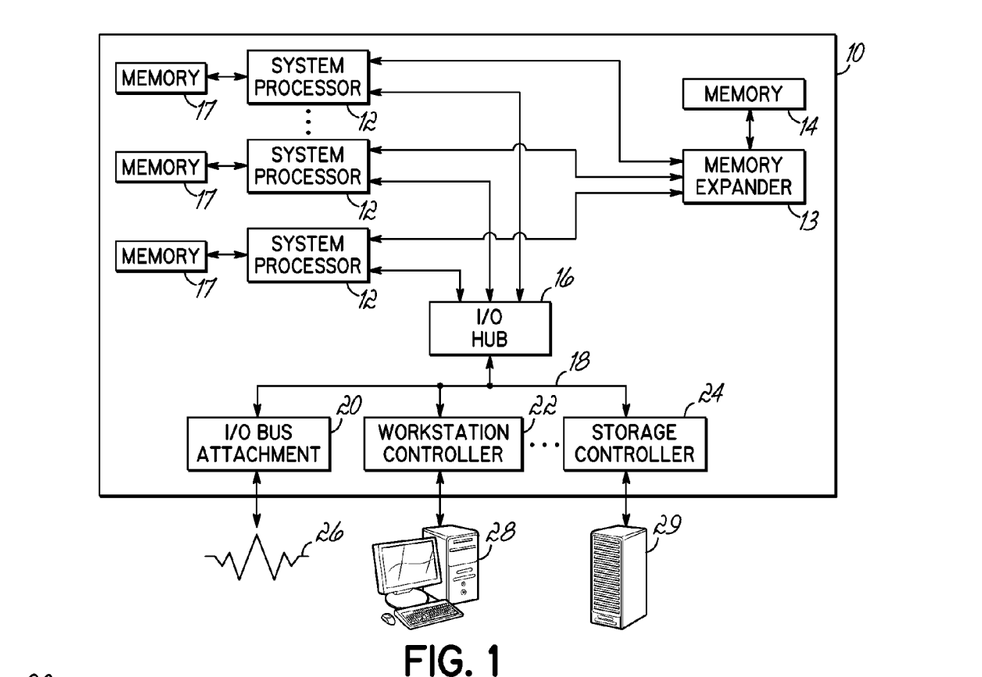
FIG. 1 is a block diagram of a computer system configured to concurrently access memory using a memory expander microchip attached to a processor having directly attached memory in accordance with the principles of the present invention.

Turning more particularly to the drawings, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in another data processing apparatus, e.g., in stand-alone or single-user computer systems such as workstations, desktop computers, portable computers, and the like, or in other computing devices such as embedded controllers, and the like. One suitable implementation of apparatus 10 may be a multi-user computer, such as the Series i computer available from International Business Machines Corporation (IBM).

Apparatus 10 generally includes one or more physical processors 12 coupled to an input/output (I/O) hub 16. Each processor may directly and respectively attach to memory 17, e.g., an array of DIMMs. Where desired, the physical processors 12 and/or environment may be multithreaded. Multithreading enables different portions of program code to execute concurrently. Also illustrated as in communication with processors 12 is a memory expander microchip 13. The memory expander microchip 13 may be in communication with additional memory 14.

Furthermore, I/O hub may couple to a number of types of external I/O devices via a system bus 18 and a plurality of interface devices. Exemplary I/O devices include a bus attachment interface 20, a workstation controller 22 and a storage controller 24. Such I/O devices may respectively provide external access to one or more external networks 26, one or more workstations 28, and/or one or more storage devices such as a direct access storage device (DASD) 29.

Figure 2:
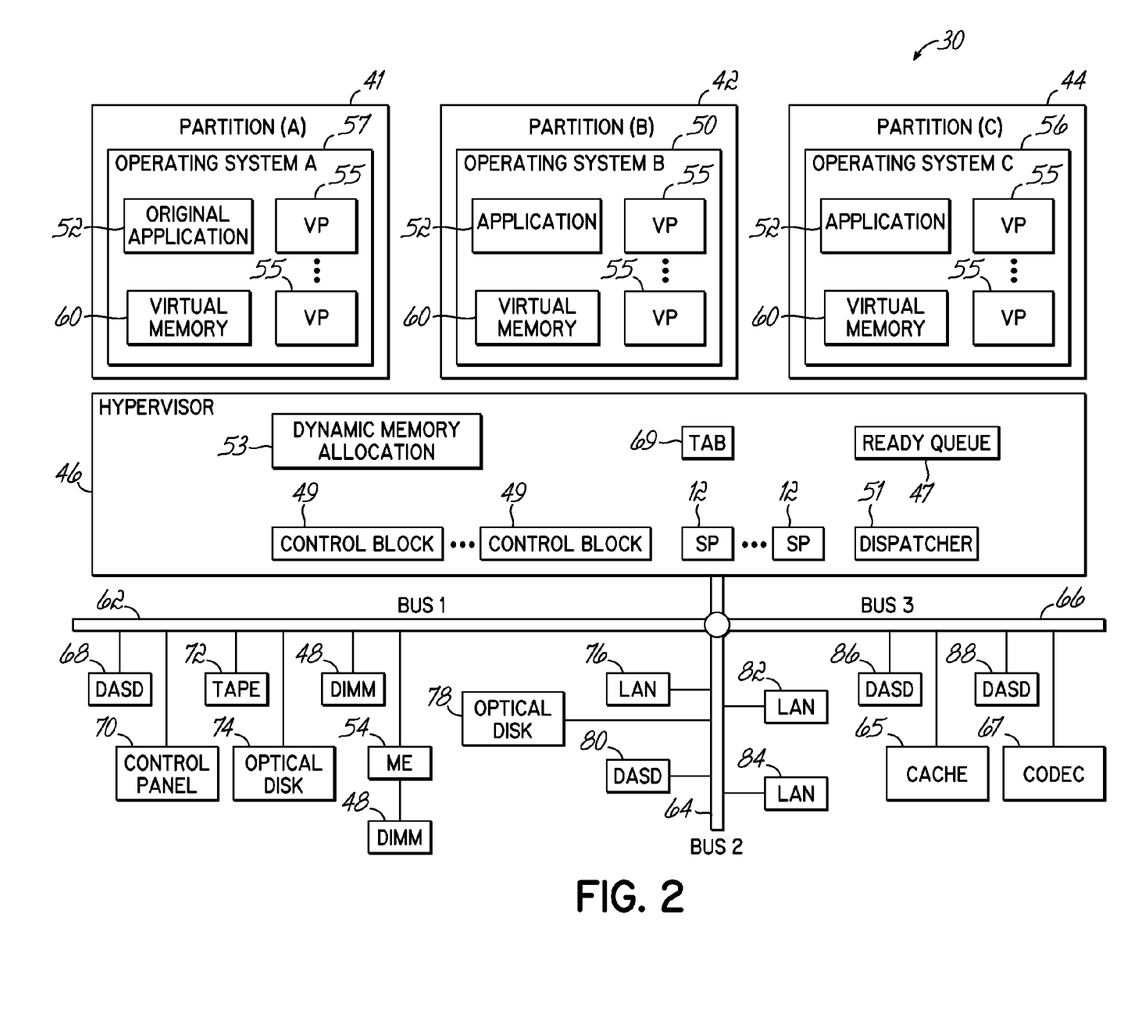
FIG. 2 is a block diagram of primary software components and resources consistent with the computer system of FIG. 1.

FIG. 2 illustrates in greater detail the primary software components and resources used to implement a logically partitioned environment consistent with apparatus 10 of FIG. 1. FIG. 2 generally shows a computing architecture characterized as a virtual machine design developed by IBM. The system 30 includes a plurality of partitions 41, 42, 44 that share common processing resources among multiple processes. Such an architecture may rely upon a single computing machine having one or more physical processors/CPUs 12. The CPUs 12 may execute software configured to simulate multiple virtual processors 55.

The partitions 41, 42, 44 may logically comprise a portion of a system's physical CPUs 12, DASD 68, and other resources as assigned by an administrator. Each partition 41, 42, 44 typically hosts an operating system 50, 56, 57 and may have multiple virtual processors 55. In this manner, each partition 41, 42, 44 operates largely as if it is a separate computer. As shown in FIG. 2, the production environment comprising each partition 41, 42, 44 may also include program code, such as the applications 52 shown in FIG. 2.

An underlying program called a hypervisor 46, or partition manager, may use this scheme to assign physical resources to each partition 41, 42, and 44. In virtualization technology, the hypervisor 46 may manage the operating systems 50, 56, 57 (or multiple instances of the same operating system) on a single computer system. The hypervisor 46 may manage the system's processor, memory, and other resources to allocate what each operating system 50, 56, 57 requires. For instance, the hypervisor 46 may intercept requests for resources from operating systems 50, 56, 57 to globally share and allocate resources. If the partitions 41, 42 and 44 are sharing processors, the hypervisor 46 may allocate physical processor cycles between the virtual processors 55 of the partitions 41, 42, 44 sharing the CPU 12.

In the context of associativity, the hypervisor 46 may accomplish additionally required data retrieval management. Significantly, such data retrieval may be accomplished in at least one embodiment without exploiting the CPU processing cycles of the operating systems 50, 56, 57. Where desired, the hypervisor 46 may include a dynamic memory allocation program 53 configured to dynamically allocate memory and/or bandwidth. The program 53 may dynamically allocate a different ratio of memory channels based on the compression cache hit ratio, for instance. As compressed data memory is reduced, the hypervisor 46 may reduce the number of available memory pages in the main store 17. As compressed data memory is increased, the hypervisor 46 may increase the number of available memory pages in main store 17.

Each operating system 50, 56, 57 controls the primary operations of its respective logical partition 41, 42, 44 in the same manner as the operating system of a non-partitioned computer. Each logical partition 41, 42, 44 may execute in a separate memory space, represented by virtual memory 60. Moreover, each logical partition 41, 42, 44 is statically and/or dynamically allocated a portion of the available resources in system 30. For example, and as discussed herein, each logical partition may share one or more physical CPUs 12, as well as a portion of the available memory space for use in virtual memory 60. In this manner, a given physical CPU 12 may be utilized by more than one logical partition 41, 42, 44.

The hypervisor 46 may include a dispatcher 51 that manages the dispatching of virtual processors to physical processors on a dispatch list or ready queue 47. The ready queue 47 comprises memory that includes a list of virtual processors having work that is waiting to be dispatched on a physical processor 12. The hypervisor 46 shown in FIG. 2 also controls physical CPUs 12, and may additionally control memory expanders 54 and DIMMs 14. Processor control blocks 49 of the hypervisor 46 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

The hardware shown in FIG. 2 optionally comprises one or more caches 65, a compression/decompression engine (CODEC) 67, memory expanders (ME) 54 and compressed storage in the DIMMs 14, 48. Within the compressed storage in the DIMMs 14, 48 and/or other memory, the system 30 may include compressed and uncompressed memory. It will be understood by one skilled in the art that the distinction between compressed and uncompressed memory may be a logical one in that both may exist in the same physical storage, for example, the same memory array. Uncompressed memory may comprise memory containing uncompressed data. In a similar fashion, compressed memory may be defined as memory containing compressed data. The data in virtual memory may reside in memory. Main store 17 may include either or both uncompressed and compressed data. One skilled in the art will appreciate that other embodiments consistent with the invention may be realized by executing the above programs in an operating system 50, 56, 57 in addition or as opposed to in the hypervisor 46.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the I/O processors used to interface the computer with the specific hardware devices.

The various software components and resources illustrated in FIG. 2 may be implemented in a number of manners, including using various computer software applications, routines, components, programs, objects, modules, data structures, etc., referred to hereinafter as computer programs, tools, programs or program code. Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and nonvolatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 41, 42 and 44 (and operating systems), but has no user interface for the customer to protect it from failures that might otherwise come about through user interaction. Furthermore, while three logical partitions 41, 42 and 44 are shown in FIG. 2, one skilled in the art will appreciate that more or fewer partitions may be implemented as needed. Other alternative hardware and/or software environments may thus be used without departing from the scope of the invention.

Figure 3:
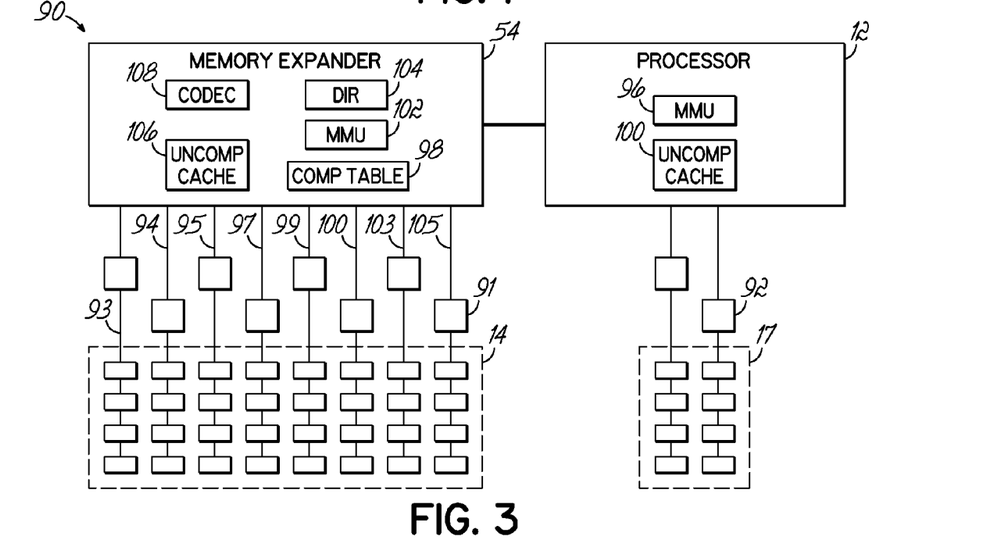
FIG. 3 shows a system having a processor having both a directly attached memory and directly attached memory expander in accordance with aspects of the present invention.

FIG. 3 shows a system 90 comprising a CPU 12 having both a directly attached memory DIMMS 17 and a directly attached memory expander 54. More particularly, the system 90 includes a CPU 12 directly attached to DIMMs 17. The memory expander microchip 54 is in communication with DIMMs 14, which may include a data cache 97. The data cache 97 may function to cache data associated with compressed data retrieved from the DIMMs 14. As shown in FIG. 3, the CPU 12 also attaches to the memory expander 54. The CPU 12 connects directly to the DIMMs 17 via memory channels and memory buffer microchips 92.

As shown in FIG. 3, the CPU 12 may include a memory management unit (MMU) 96 and a data cache 100. The DIMMs 17 are directly attached in that they may be proximate to and/or in uninterrupted communication with the CPU, as opposed to remote memory, e.g., on a disk.

The memory expander microchip 54 of FIG. 3 may connect directly to the compressed and/or uncompressed storage in the DIMMs 14. More particularly, the embodiment uses a direct connection including the memory channels 93, 94, 95, 97, 99, 100, 103, 105 and memory buffer microchips 91. In another embodiment, the memory expander 54 may merely be in communication with DIMMs 14. As such, the memory expander 54 need not be attached directly to the DIMMs 14.

The memory expander 54 may include a MMU 101, a compressed cache directory 104, a compressed data table 98 and a data cache 97. The data cache 97 may include uncompressed and cached data associated with either uncompressed or compressed data stored in memory 14, 17. The MMU 101 may programmatically implement compression/decompression and other memory functions. For this purpose, the memory expander 54 may also include a CODEC 108. As discussed herein, embodiments consistent with the invention allow the MMU 101 to implement and otherwise manage such memory functions without burdening the CPU 12 or hypervisor 46.

The associativity is made possible, in part, by the bandwidth of the memory expander 54. As shown in FIG. 3, the memory expander microchip 54 includes eight memory channels 93, 94, 95, 97, 99, 100, 103, 105. As discussed herein, each memory channel 93, 94, 95, 97, 99, 100, 103, and 105 may comprise a data channel configured to deliver data from the memory expander microchip 54 to the DIMMs 14. Each memory channel 93, 94, 95, 97, 99, 100, 103, 105 may include: format conversion devices, encoders (compressors) and decoders (decompressors), buffers, stream segmentation and reassembly devices, multiplexors and demultiplexors, modulators and demodulators, transmission facilities, switches, multipoint conference units, and/or other components necessary to achieve the desired channel characteristics.

In this manner, the memory expander microchip 54 provides eight memory channels 93, 94, 95, 97, 99, 100, 103, 105 worth of bandwidth in addition to the standard bandwidth from the DIMMs 17 directly attached to the processor 12. The eight memory channels 93, 94, 95, 97, 99, 100, 103, 105 provide more than enough bandwidth to support accesses to a compression cache 97 and the compressed data directory (addresses to the compressed data) 104.

Some of the memory channels 93, 94, 95, 97, 99, 100, 103, 105 on the memory expansion microchip 54 may be statically or dynamically allocated to compressed data, and others may similarly be allocated for the data cache 97. Memory 17 attached directly to the processor 12 may include standard uncompressed data regions (neither compressed data nor a compression cache). Each memory channel 93, 94, 95, 97, 99, 100, 103, 105 dedicated to the data cache 97 may comprise a class for the data cache 97. All classes from the data cache 97 may be accessed in parallel, or concurrently. The MMU 101 logic on the memory expander microchip 54 may determine if there is a hit to any of the classes. The hit information may come from the data cache 97 or the compressed data directory 104. If any of the data cache classes has a hit, that data may be forwarded to the processor 12 in the fashion of a conventional main data store.

Four of the eight memory channels 93, 94, 95, 97 of the memory expander 54 may be allocated to the compressed data and compressed data directory 104. The other four memory channels 99, 100, 103, 105 may be allocated to the data cache 97. As such, the data cache 97 may include four-way associative processes by virtue of using the four memory channels 106, 107, 108, 109 allocated to the data cache 97.

As will be apparent to one of skill in the art, the memory expander microchip 54 may include fewer or more than eight memory channels 93, 94, 95, 97, 99, 100, 103, 105. Moreover, there may be more than one memory expander microchip 54, and more or less memory channels could be allocated to the data cache 97.

The memory expansion microchip compression control logic (e.g., MMU 101) may dynamically allocate a different ratio of channels between compressed data and the data cache 97 based on the compression cache hit ratio. The data cache associativity may be dynamically increased and decreased to determine the optimal associativity ratio to compressed data.

As compressed data memory is reduced, the operating system or hypervisor 46 may reduce the number of available memory pages in the main store. As compressed data memory is increased, the operating system or hypervisor 46 may increase the number of available memory pages in main store.

The memory expander microchip 54 of another or the same embodiment may include some attached memory comprising standard, uncompressed memory data, e.g., not data cache or compressed data. In addition to static allocation, the hypervisor 46 or operating system may monitor compression ratios and make more memory on a memory expansion microchip be standard memory. This may occur if the compression ratio is low. If the compression ratio is high, more memory on the memory expansion microchip may be compressed data.

While the compressed data cache 97 is shown as being on the memory expander 54 in FIG. 3, another embodiment may position the compressed data cache within compressed storage in the DIMMs 14. In another or the same embodiment, memory compression logic, such as the MMU 101, could be inserted on memory buffer microchips 91 inserted in each memory channel 93, 94, 95, 97, 99, 100, 103, 105 between the physical processor 12 and the compressed storage in the DIMMs 14.

In order to improve performance, the data cache 100 typically has a fast access time. Within the general scheme of processor memory accesses, most memory accesses fall within a small range of the total available memory storage. A memory architecture, according to embodiments of the present invention, may be used with a most recently used control scheme to maintain the most active segments of memory within the data cache 100. The function of the uncompressed cache directory 104 is to determine if the memory access is in uncompressed data cache 97 or not, and if it is in uncompressed data cache 97, to provide the address in physical memory where the data resides.

A function of the compressed data table 98 is to provide a listing for the memory locations that are in the compressed storage in the DIMMs 14. When an access to the memory misses the compressed data cache 97, it generates an access to the compressed compression data table 98. The data from this access contains the location of the data within compressed storage in the DIMMs 14. The address results in an access to the compressed storage in the DIMMs 14, which in turn may result in compressed data being accessed and processed by the CODEC 108. The CODEC 108 may perform compression and decompression on the data. The resultant uncompressed data may be placed in the data cache 100 and transferred to the requesting element (for a fetch), or updated and maintained within the data cache 100 for a store.

The compressed storage in the DIMMs 14 may physically be relatively larger than the DIMMs 17. It may contain the compressed data (which is variable in length) and is stored into a variable number of frames. These frames may be inherently smaller than the data block size that is being compressed.

Figure 4:
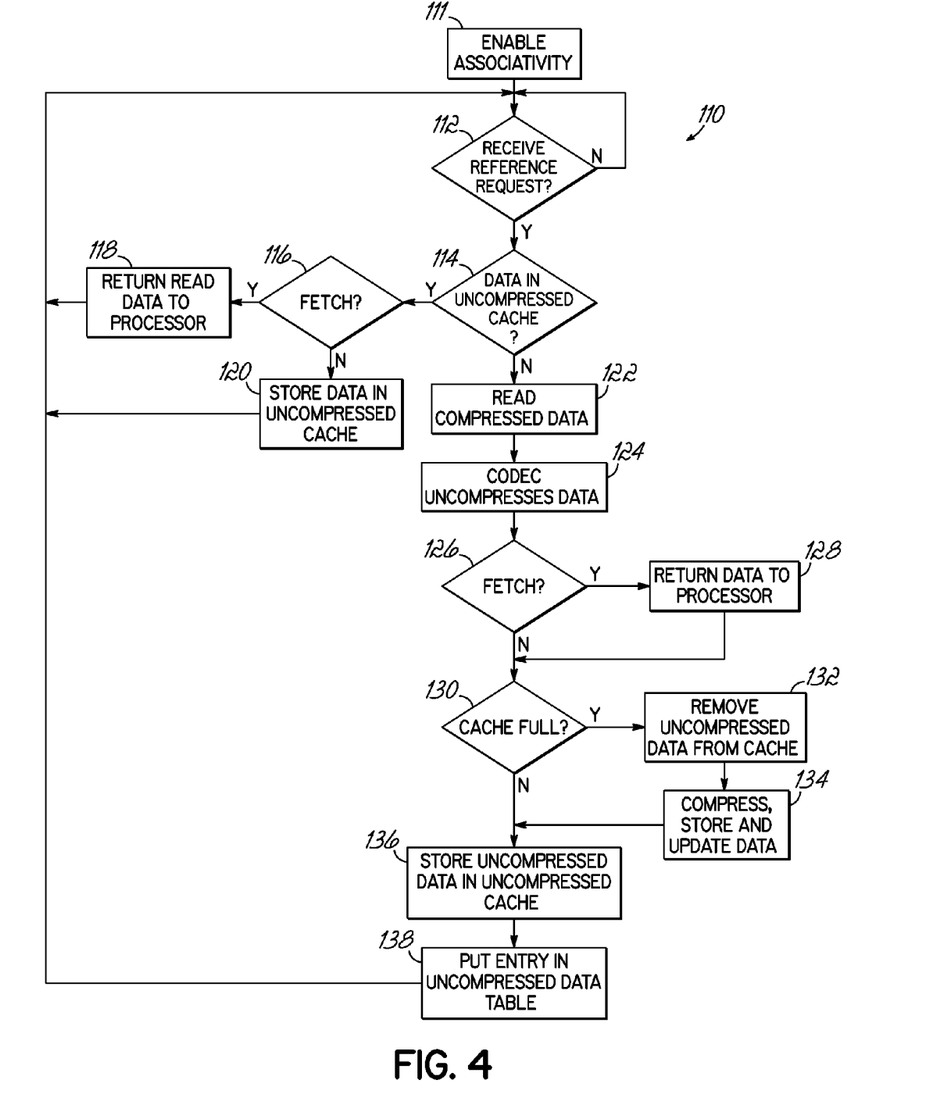
FIG. 4 is a flowchart showing examples of concurrent read and write operations in an embodiment featuring associativity operations involving both a memory expander and a processor with directly attached memory.

FIG. 4 is a flowchart 110 showing examples of multi-way read and write operations in an embodiment using a memory architecture consistent with aspects of the present invention. Turning more particularly to the steps of the flowchart 110, associativity may be manually or automatically enabled at block 111. The system 90 may receive at block 112 a memory reference request, and determine at block 114 if the data is in the data cache directory 104.

If the data is in the data cache directory 104, the system 90 then may check at block 116 whether the command was a fetch or store. If it was a fetch, the system 90 may then retrieve at block 118 the data and transmit it to the physical processor 12 or other requesting unit. If the command was a store at block 120, the data may be stored in the data cache 106. Storage operations may particularly benefit from the associativity provided by aspects of the invention.

If the data is otherwise in the compressed storage in the DIMMs 14, the system 90 may initiate a read of the compressed data at block 122. As with other steps of the flowchart 110, the operation may be handled concurrently with other memory accesses per the enabled associativity. The CODEC 108 may uncompress the data at block 124.

The system 90 may determine at block 126 if the request is a fetch. If so, then the data may be returned to the processor 12 at block 128.

If the request is alternatively to store data, then the system 90 may determine at block 130 if the data cache 106 is full. If the data cache 106 is full, then the system 90 may initiate at block 134 a cast out operation. That is, the system 90 may remove at block 132 the least recently used data element in the data cache 106 to the compressed storage in the DIMMs 14. Accordingly, the data may be sent to the CODEC 108 for compressing at block 134. The system 90 may additionally store the compressed data in the compressed memory/DIMMs 14, and update the data element in the compressed data table 98. As discussed herein, one more of these operations may be accomplished concurrently.

Where the uncompressed data cache is not full at block 130, the system 90 may store at block 136 the uncompressed data in the data cache 106 (along with any store updates). The system 90 may place an entry in the compressed data table 98, as appropriate. Where the data cache 106 is held in storage with the uncompressed data on main memory, a read may result in a retrieval of the data along with bits indicative of an address of cache. Where different components are not collocated, multiple reads may be needed.

In one embodiment, the system 90 may determine and appropriately store data according to its frequency of use. Namely, most frequently used data may be stored in DIMMs 17 directly attached to the physical processor 12. Less frequently used data may be stored in compressed storage in the DIMMs 14 directly attached to the memory expander microchip 54. The system 90 may continually shift stored data by adding new data and transferring old data into the compressed storage in the DIMMs 14, which may occur as a background process. This is an example of a most recently used algorithm for writing data to memory. The flowchart 110 shown in FIG. 4 is only one example of read and write operations using the memory architecture of the present invention, other such operations are possible.

While the present invention has been illustrated by a description of various embodiments and while these embodiments have been described in considerable detail, it is not the intention of the Applicant to restrict, or in any way limit the scope of the appended claims to such detail. For instance, while associativity logic is discussed herein as being present on a memory expander, other embodiments may insert memory compression logic on a buffer located on the memory channels 93, 94, 95, 97, 99, 100, 103, 105 that are positioned between the processor and the circuit boards that hold memory microchips, e.g., the DIMMs.

The invention in its broader aspects is therefore not limited to the specific details, representative apparatus and method, and illustrative example shown and described. For example, the memory attached to the memory expander may in some applications store an uncompressed data cache and/or uncompressed data for further processing advantages.

Accordingly, departures may be made from such details without departing from the spirit or scope of Applicant's general inventive concept.

What is claimed is:

1. A method comprising:
receiving a memory reference request from a processor, the memory reference request associated with a data element, wherein the processor is directly attached to a first memory, wherein the processor is communicatively coupled to a second memory via a plurality of memory channels, wherein the second memory is configured to store compressed data, a compressed data directory, and a compression cache, and wherein each memory channel is associated with an amount of bandwidth for the processor to access the compressed data, the compression cache, and the compressed data directory in the second memory;
allocating a first group set of memory channels of the plurality of memory channels to the compressed data and the compressed data directory;
allocating a second group of memory channels of the plurality of memory channels to the compression cache; and
dynamically altering a memory channel allocation ratio, wherein the memory channel allocation ratio is established between the first group of memory channels and the second group of memory channels.

2. The method of claim 1, wherein each memory channel of the second group of memory channels establishes a way associated with the compression cache.

3. The method of claim 2, further comprising searching the compression cache for the data element via the second group of memory channels, wherein each way of the second group of memory channels is utilized in parallel.

4. The method of claim 1, further comprising:
executing the memory reference request to store the data element; and
removing a block of uncompressed data from an uncompressed cache.

5. The method of claim 4, further comprising storing the block of uncompressed data removed from the uncompressed cache, wherein the block of uncompressed data is stored based on a determined frequency of use associated with the block of uncompressed data.

6. The method of claim 1, wherein dynamically altering the memory channel allocation ratio is based on a compression cache hit ratio.

7. The method of claim 1, wherein dynamically altering the memory channel allocation ratio is based on a compression ratio.

8. The method of claim 7, wherein the compression ratio is based on a first amount of uncompressed memory and a second amount of compressed memory.

9. The method of claim 1, further comprising enabling associativity prior to executing the memory reference request, wherein associativity permits multi-way read operations and multi-way write operations via the plurality of memory channels.

10. An apparatus comprising:
a first memory configured to store first data in an uncompressed data;
a second memory configured to store first compressed data, a compression cache, and a compressed data directory;
a processor directly attached to the first memory, wherein the processor is communicatively coupled to the second memory, and wherein the processor is configured to generate a memory reference request associated with a data element;
a plurality of memory channels communicatively coupled to the second memory, wherein each memory channel is associated with an amount of bandwidth for the processor to access the first compressed data, the compression cache, and the compressed data directory in the second memory, wherein a first group of memory channels of the plurality of memory channels is allocated to the first compressed data and the compressed data directory, and wherein a second group of memory channels of the plurality of memory channels is allocated to the compression cache; and
a memory expander directly attached to the processor, wherein the processor is communicatively coupled to the second memory via the memory expander, wherein the memory expander is communicatively coupled to the second memory via the plurality of memory channels, wherein the memory expander dynamically alters a memory channel allocation ratio, and wherein the memory channel allocation ratio is established between the first group of memory channels and the second group of memory channels.

11. The apparatus of claim 10, wherein the memory expander includes an uncompressed cache, wherein the uncompressed cache stores second uncompressed data.

12. The apparatus of claim 11, wherein the memory expander removes a block of the second uncompressed data from the uncompressed cache.

13. The apparatus of claim 12, wherein the memory expander stores the block of the second uncompressed data removed from the uncompressed cache, wherein the block of the second uncompressed data is stored based on a determined frequency of use associated with the block of the second uncompressed data.

14. The apparatus method of claim 10, wherein dynamically altering the memory channel allocation ratio is based at least in part on a compression cache hit ratio.

15. The apparatus of claim 14, further comprising a compressed data table associated with the first compressed data, wherein the compressed data table is communicatively coupled to the memory expander, and wherein the compression cache hit ratio is associated with the compressed data table.

16. The apparatus of claim 14, wherein the compression cache hit ratio is associated with the compression cache.

17. The apparatus method of claim 10, wherein each memory channel of the second group of memory channels establishes a way associated with the compression cache.

18. The apparatus of claim 17, wherein the memory expander searches the compression cache for the data element via the second group of memory channels, wherein each way of the second group of memory channels is utilized in parallel.

19. The apparatus of claim 10, wherein the memory expander stores the data element in one of the first memory and the second memory according to a determined frequency of use associated with the data element.

20. The apparatus of claim 19, wherein the determined frequency of use identifies most frequently used data, and wherein the most frequently used data is stored in the first memory.

21. A non-transitory computer-readable medium including computer-executable instructions that, when executed by a first processor, cause the first processor to:
- receive a memory reference request from a second processor, the memory reference request associated with a data element, wherein the second processor is directly attached to a first memory, wherein the second processor is communicatively coupled to a second memory via a plurality of memory channels, wherein the second memory is configured to store compressed data, a compressed data directory, and a compression cache, wherein each memory channel is associated with an amount of bandwidth for the second processor to access the compressed data, the compressed data directory, and the compression cache in the second memory, and wherein the first processor is directly attached to the second processor;
- allocate a first group of memory channels of a plurality of memory channels to the compressed data and the compressed data directory;
- allocate a second group of memory channels of the plurality of memory channels to the compression cache; and
- dynamically alter a memory channel allocation ratio, wherein the memory channel allocation ratio is established between the first group of memory channels and the second group of memory channels.

* * * * *